United States Patent
Tung et al.

(10) Patent No.: US 9,483,415 B2
(45) Date of Patent: Nov. 1, 2016

(54) METHOD AND APPARATUS FOR MANAGING MEMORY

(71) Applicant: MStar Semiconductor, Inc., Hsinchu Hsien (TW)

(72) Inventors: Yi-Shin Tung, Zhubei (TW); He-Yuan Lin, Zhubei (TW); Jia-Wei Lin, Zhubei (TW); Hung-Wei Yang, Zhubei (TW)

(73) Assignee: MStar Semiconductor, Inc., Hsinchu Hsien (TW)

( * ) Notice: Subject to any disclaimer, the term of this patent is extended or adjusted under 35 U.S.C. 154(b) by 73 days.

(21) Appl. No.: 14/492,211

(22) Filed: Sep. 22, 2014

(65) Prior Publication Data

US 2015/0089170 A1    Mar. 26, 2015

(30) Foreign Application Priority Data

Sep. 23, 2013  (TW) .............................. 102134149 A

(51) Int. Cl.
*G06F 12/02* (2006.01)
*G06F 12/12* (2016.01)

(52) U.S. Cl.
CPC .......... *G06F 12/123* (2013.01); *G06F 12/023* (2013.01); *G06F 2212/1044* (2013.01); *G06F 2212/401* (2013.01); *G06F 2212/69* (2013.01); *G06F 2212/70* (2013.01)

(58) Field of Classification Search
CPC .............. G06F 12/023; G06F 12/123; G06F 2212/1044; G06F 12/02; G06F 12/12; G06F 2212/00; G06F 2212/10; G06F 2212/1041
See application file for complete search history.

(56) References Cited

U.S. PATENT DOCUMENTS

| | | | | |
|---|---|---|---|---|
| 5,696,926 A * | 12/1997 | Culbert | ................. | G06F 12/023 711/105 |
| 5,805,932 A * | 9/1998 | Kawashima | ............ | H03M 7/48 360/48 |
| 6,175,896 B1 * | 1/2001 | Bui | ..................... | G06F 12/0802 709/247 |
| 6,324,621 B2 | 11/2001 | Singh et al. | | |
| 7,024,512 B1 * | 4/2006 | Franaszek | ............. | G06F 12/023 704/500 |
| 7,587,572 B1 * | 9/2009 | Stenstrom | ............... | G06F 12/08 711/173 |
| 2001/0047447 A1 * | 11/2001 | Katsuda | .................... | G06F 8/60 711/1 |
| 2002/0118306 A1 * | 8/2002 | Lee | ........................ | G06F 12/023 348/714 |

(Continued)

FOREIGN PATENT DOCUMENTS

WO    9514274    5/1995

OTHER PUBLICATIONS

Taiwan Office Action dated Dec. 26, 2014, 5 pages.

*Primary Examiner* — Jared Rutz
*Assistant Examiner* — Jean Edouard
(74) *Attorney, Agent, or Firm* — Edell, Shapiro & Finnan, LLC

(57) ABSTRACT

An apparatus for managing a memory including a working region and a compression region is provided. The working region stores uncompressed data. The apparatus includes a management module and a compression/decompression module. According to a recent used index and a compression ratio of a set of target data stored in the working region, the management module determines whether to transfer the target data to the compression region. When the management module determines to transfer the target data to the compression region, the compression/decompression module compresses the target data and transfers the compressed target data to the compression region.

20 Claims, 10 Drawing Sheets

(56) References Cited

U.S. PATENT DOCUMENTS

| | | | | |
|---|---|---|---|---|
| 2004/0250009 A1* | 12/2004 | Chen | ............... | G06F 3/0608 711/103 |
| 2007/0005911 A1* | 1/2007 | Yang | ............... | G06F 12/023 711/154 |
| 2008/0154982 A1* | 6/2008 | Watanabe | ............... | G06F 17/3028 |
| 2009/0112949 A1* | 4/2009 | Ergan | ............... | G06F 12/0802 |
| 2010/0260505 A1* | 10/2010 | Dahan | ............... | H04B 10/541 398/183 |
| 2014/0189281 A1* | 7/2014 | Sokol, Jr. | ............... | G06F 12/08 711/171 |

* cited by examiner

METHOD AND APPARATUS FOR MANAGING MEMORY

This application claims the benefit of Taiwan application Serial No. 102134149, filed Sep. 23, 2013, the subject matter of which is incorporated herein by reference.

BACKGROUND OF THE INVENTION

1. Field of the Invention

The invention relates in general to a memory management technology, and more particularly to a memory management technology applicable to a memory that simultaneously includes a working region and a compression region.

2. Description of the Related Art

Memories are an essential part in most electronic products. Taking a computer system for example, a dynamic random access memory (DRAM) is usually provided therein for temporarily storing various kinds of data or program codes required for system operations. The DRAM is advantaged by having a fast access speed and yet disadvantaged by having a cost higher than that of a hard drive or a flash memory. To attend to both considerations of hardware costs and available temporary storage space size, certain electronic systems are designed to adopt a DRAM as a primary memory and to adopt a part of a hard drive as a secondary memory. Data having a higher least recent used (LRU) index is transferred from the primary memory to the secondary memory, and relocated back to the primary memory when again utilized. Such approach is commonly referred to as swapping. However, with the swapping method, the overall efficiency is still limited by the slow data access speed of the secondary memory.

Thus, there is another memory management solution that divides the memory space of a same DRAM into a working region and a compression region. The working region stores uncompressed data. Similarly, data having a higher recent used index is compressed and transferred to the compression region. Only when needed, the data previously transferred is fetched from the compression region, decompressed and relocated back to the working region. Given appropriate compression algorithms, the compression and decompression procedures do not consume an excessive amount of operation resources. Compared to a situation where an entire DRAM is utilized as a working region, such solution stores more data in a memory space of the same size to provide enhanced utilization efficiency. However, as the compression region occupies a part of the memory space of the DRAM, it is in equivalence reducing the available capacity of the working region, which may lead to a rise in the frequency of data exchange between the working region and the compression region. Known to a person skilled in the art, the overall performance of the electronic system becomes lower as the frequency of data exchange gets higher.

SUMMARY OF THE INVENTION

The invention is directed to a method and apparatus for managing a memory. By simultaneously considering a recent used index and a compression ratio of data, the method and apparatus of the present invention are capable of effectively increasing the amount of data that can be stored in a compression region. In other words, given the same amount of data to be stored, the size of the compression region can be reduced, which is in equivalence increasing the available capacity of the working region and lowering the frequency of data exchange. Further, by handling over all or a part of the memory management task to an auxiliary processor, a primary processor that an electronic system utilizes for operating with the memory can be prevented from an excessive additional load.

According to an embodiment of the present invention, an apparatus for managing a memory including a working region and a compression region is provided. The working region stores uncompressed data. The apparatus includes a management module and a compression/decompression module. According to a recent used index and a compression ratio of a set of target data stored in the working region, the management module determines whether to move the target data to the compression region. When the management module determines that the target data is to be moved the compression region, the compression/decompression module compresses the target data and moves the compressed target data to the compression region.

According to another embodiment of the present invention, a method for managing a memory including a working region and a compression region is provided. The working region stores uncompressed data. The method includes evaluating a recent used index and a compression ratio of a set of target data stored in the working region, and determining whether to compress and moved the target data to the compression region according to the recent used index and the compression ratio.

According to yet another embodiment of the present invention, a method for managing a memory including a working region and a compression region is provided. The working region stores uncompressed data. The method includes determining whether a used ratio of the working region and a used ratio of the compression region establish a predetermined condition; when the predetermined condition is established, determining whether to move and store a set of target data stored in the working region to the compression region according to a recent used index and a compression ratio of the target data.

The above and other aspects of the invention will become better understood with regard to the following detailed description of the preferred but non-limiting embodiments. The following description is made with reference to the accompanying drawings.

DETAILED DESCRIPTION OF THE INVENTION

Figure 1:
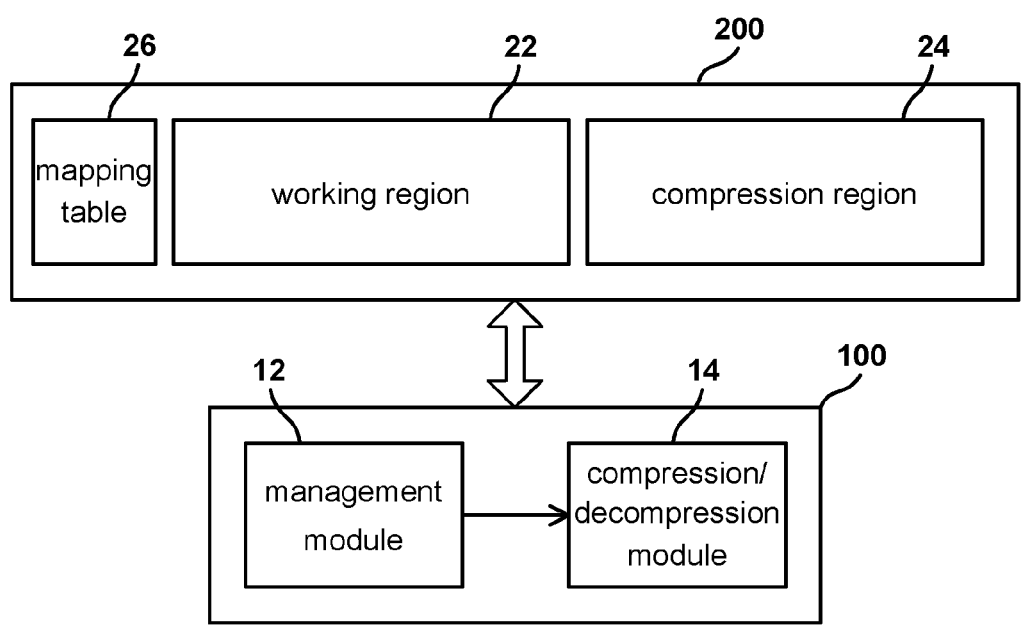
FIG. 1 is a functional block diagram of an apparatus for managing a memory according to an embodiment of the present invention.

FIG. 1 shows a functional block diagram of an apparatus for managing a memory according to an embodiment of the present invention. It should be noted that, the term "present invention" refers to inventive concepts described by the non-limiting embodiments. Referring to FIG. 1, a memory management apparatus 100 is for managing a memory 200 including a working region 22 and a compression region 24. The working region 22 stores uncompressed data. The compression region 24 stores compressed data. A mapping table 26 records a mapping relationship of data in the working region 22 and the compression region 24.

The memory management apparatus 100 of the embodiment includes a management module 12 and a compression/decompression module 14. According to a recent usage index and a compression ratio of a set of target data stored in the working region 22, the management module 12 determines whether to move the target data to the compression region 24. A function with the recent usage index and the compression ratio as independent variables may be pre-defined. The recent usage index and the compression ratio of each set of data are substituted into the function to obtain a function value, which serves as a reference for determining whether to move data. In one embodiment, the recent usage index may be a 'least recent usage (LRU) index'; when so presented, the higher the value of the recent usage index is, the longer time from the last time the data has been used. It is decided that the possibility of the data being used around present time is less, and thus, data with higher recent usage index is suitable to be moved to the compression region 24. In the description below, it is assumed that the memory 200 accesses data by pages and the management module 12 uses the least recent usage index LRU as the recent usage index. Through embodiments below, one person skilled in the art can fully understand that the scope of the present invention is not limited by such assumption.

In practice, the compression/decompression module 14 may handle the evaluation of the compression ratio of the individual pages in the working region 22. A higher compression ratio of one set of data indicates a smaller data amount after this set of data is compressed. That is to say, the memory space occupied by this set of compressed data in the compression region 24 is far less than that occupied by this set of data when uncompressed in the working region 22, hence significantly saving the storage space of the working region 22 in the memory. The recent usage index and the compression ratio of each page in the memory 200 are recorded in the mapping table 26.

In one embodiment, a function F(LRU, CR) using the recent usage index LRU and the compression ratio CR as independent variables is defined as:

$$F(LRU, CR) = W1 * LRU + W2 * CR \quad (1)$$

In the above equation, coefficients W1 and W2 are not limited to specific values, and may be determined according to software/hardware conditions of the actual application by a designer of the memory management apparatus 100. Further, the coefficients W1 and W2 may also be dynamically adjusted during an operation process of the memory management module 100. Associated details shall be described shortly.

The management module 12 determines whether to move a set of target data from the working region 22 to the compression region 24 according to the function value. For the function defined by equation (1), one set of data having a higher function value is more suitable and has a higher priority to be moved to the compression region 24. This set of data may be seen as target data. When the management module 12 determines to move the set of target data to the compression region 24, the compression/decompression module 14 compresses the target data, and moves the compressed target data to the compression region 24.

Figure 2:
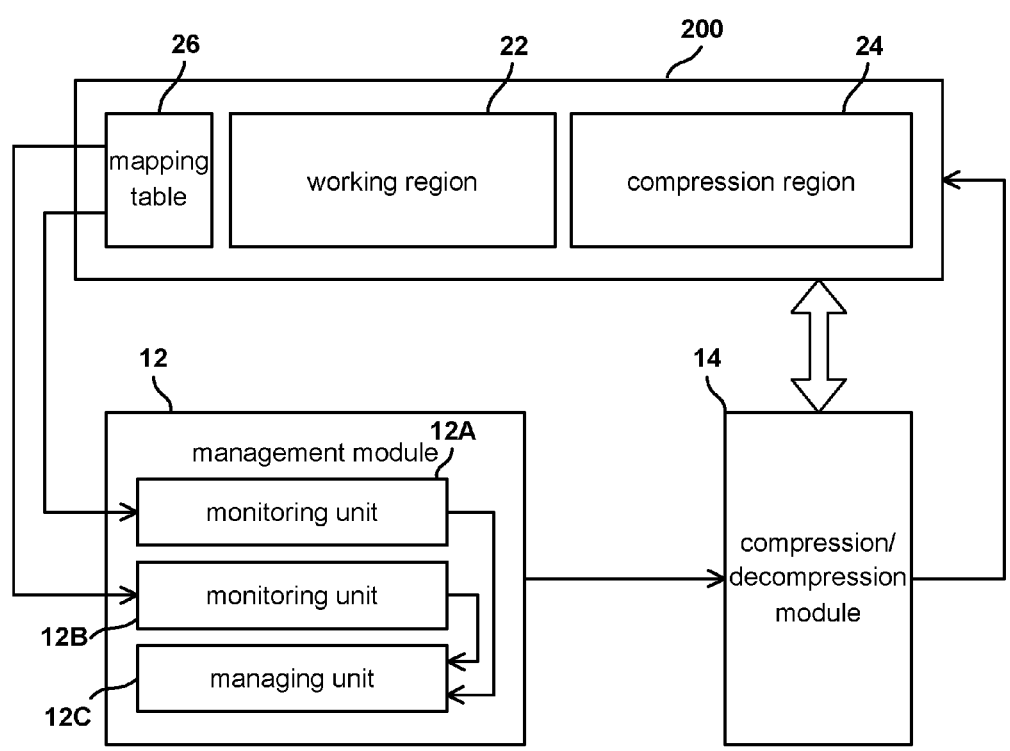
FIG. 2 is a detailed example of a management module according to an embodiment of the present invention.

FIG. 2 shows a detailed example of the management module 12 according to an embodiment. In this example, the management module 12 further includes a monitoring unit 12A for working region, a monitoring unit 12B for compression region, and a managing unit 12C. The monitoring unit 12A evaluates a usage ratio of the working region 22. The monitoring unit 12B evaluates a usage ratio of the compression region 24. In practice, the monitoring unit 12A and the monitoring unit 12B may determine the two usage ratios according to information in the mapping table 16. In one embodiment, only when a predetermined condition is met, the management module 12 then determines whether to move data from the working region 22 to the compression region 24 according to the recent usage index LRU and the compression ratio CR. The managing unit 12C may be in charge of determining whether the above predetermined condition is met according to monitoring results of the monitoring unit 12A and the monitoring unit 12B.

In one embodiment, the managing unit 12C determines the values of the coefficients W1 and W2 according to the usage ratio of the working region 22 and/or the usage ratio of the compression region 24. For example, when the usage ratio of the working region 22 is lower than a first threshold (e.g., 40%), i.e., when the available space of the working region 22 is abundant, the managing unit 12C sets the weighted coefficient W2 to zero, that means, the managing unit 12C determines whether to move the data in the working region 22 according to only the recent usage index LRU without considering the compression ratio CR. When the usage ratio of the working region 22 is higher than the first threshold, the management module 12 then determines whether to transfer the data from the working region 22 to the compression region 24 according to both the recent usage index LRU and the compression ratio CR. Under such circumstances, the managing unit 12C may still dynamically the values of the coefficients W1 and W2 according to the usage ratio of the working region 22 and/or the usage ratio of the compression region 24.

In one embodiment, as the used ratio of the compression region 24 gets higher, the managing unit 12C sets the coefficients W1 and W2 in a way that the function value becomes more associated with the compression ratio. For example, the managing unit 12C renders the coefficient W1 to be smaller or renders the coefficient W2 to be larger as the used ratio of the compression region 24 gets higher. In other words, the managing unit 12C renders the used ratio of the compression region 24 to be positively correlated with the coefficient W2. The coefficient W2 may be positively adjusted by various approaches according to the compression region 24. For example, a most intuitive approach is that the managing unit 12C linearly adjusts the coefficient W2. Alternatively, the managing unit 12C may adjust the coefficient W2 by a stepped approach. For example, when the used ratio of the compression region 24 is higher than a threshold, the coefficient W2 is increased according to a positive change curve as the used ratio gets higher. The managing unit 12C may further adopt another higher threshold. When the used ratio is higher this higher threshold, the coefficient W2 is increased according to another different change curve. Further, the managing unit 12C may also establish a look-up table of the used ratio of the compression region 24 and the coefficient W2 to dynamically change the value of the coefficient W2 according to the look-up table.

Figure 3A:
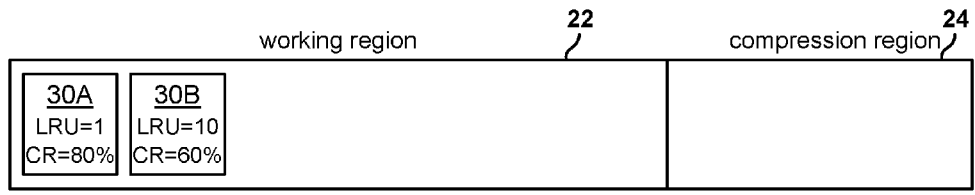
FIG. 3(A) to FIG. 3(F) illustrate operation details and operation results of a management module according to an embodiment of the present invention.
Figure 3B:
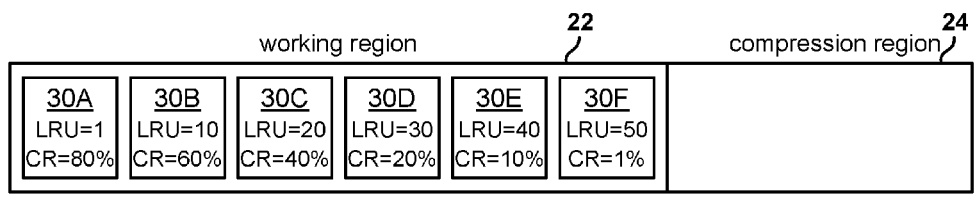
Figure 3C:
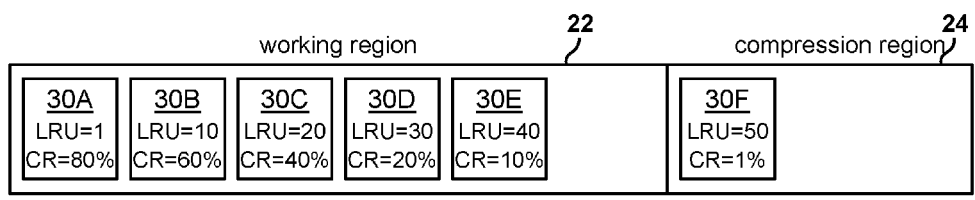
Figure 3D:
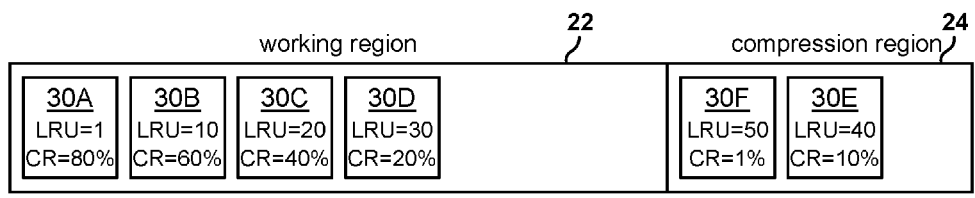

FIG. 3(A) to FIG. 3(F) illustrate operation details and operation results of the management module 12 according to an embodiment of the present invention. In the example in FIG. 3(A), the working region 22 stores data only in pages 30A and 30B. It should be noted that, in the following description, "data stored in memory pages" will be stated as "page(s)" for brevity. It should not be limiting the scope of the present disclosure. Assume that the usage ratio of the working region 22 is already lower than a first threshold. At this point, the management module 12 does not utilize the compression region 24, i.e., the pages in the working region 22 are not transferred to the compression region 24. Referring to FIG. 3(B), the working region 22 contains a larger number of pages (of data)—six pages 30A to 30F are stored in the working region 22. Because it is detected that the usage ratio of the working region 22 is higher than the first threshold and the usage ratio of the compression region 24 is rather low (e.g., lower than another threshold), the management module 12 sets the coefficient W2 to zero according to the usage ratio of the compression region 24. In this example, the page 30F with the highest recent usage index LRU is first compressed and transferred to the compression region 24, with a situation after the transfer as shown in FIG. 3(C). As the situation in FIG. 3(C) still indicates that the usage ratio of the working region 22 is higher than the first threshold and the usage ratio of the compression region 24 is still rather low, the management module 12 keeps setting the coefficient W2 to zero. Thus, the page 30E having the second highest recent usage index LRU is compressed and transferred to the compression region 24, with a situation after the transfer as shown in FIG. 3(D).

Figure 3E:
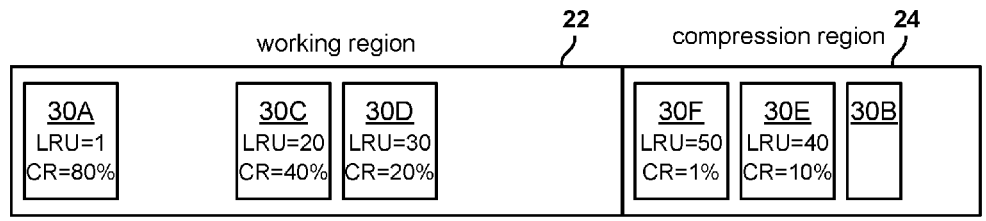

In the example in FIG. 3(D), the usage ratio of the working region 22 is higher than the first threshold, and the usage ratio of the compression region has reached a rather high level. Thus, the management module 12 adjusts the coefficient W1 of the recent usage index LRU and the coefficient W2 of the compression ratio CR to increase the effect that the compression ratio CR has on the function value, and determines which page is to be moved according to the calculated function value. The function value in equation (1) is equivalent to a weighted sum of the recent usage index LRU and the compression ratio CR. Assume that the weighted sums of the pages 30A to 30D are arranged in a decreasing order: $S_B > S_C > S_D > S_A$. The management module 12 may select the page 30B having the largest weighted sum, and compress and move the page 30B to the compression region 24, with a situation after the transfer as shown in FIG. 3(E). In the situation in FIG. 3(E), the usage ratio of the working region 22 is still higher than the first threshold, and the usage ratio of the compression region 24 is also high. Thus, the management module 12 continues to compress and move the page 30C having the largest weighted sum among the pages 30A, 30C and 30D, with a situation after the transfer as shown in FIG. 3(F).

Figure 3F:
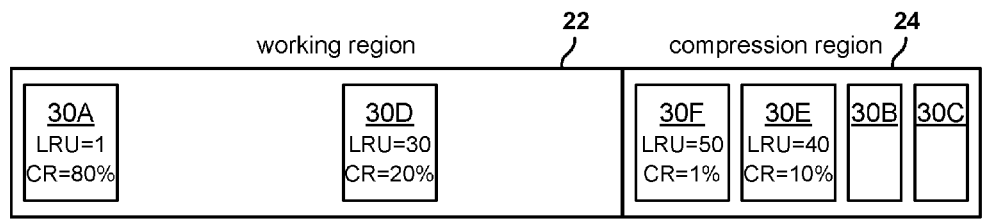

In the example in FIG. 3(F), the used ratio of the working region 22 is lower than the first threshold, and the management module 12 temporarily halts the transfer process. In practice, one possibility is that, the management module 12 may delete the page with the highest recent usage index LRU if the capacity of the compression region 24 is insufficient for accommodating more pages.

Figure 4:
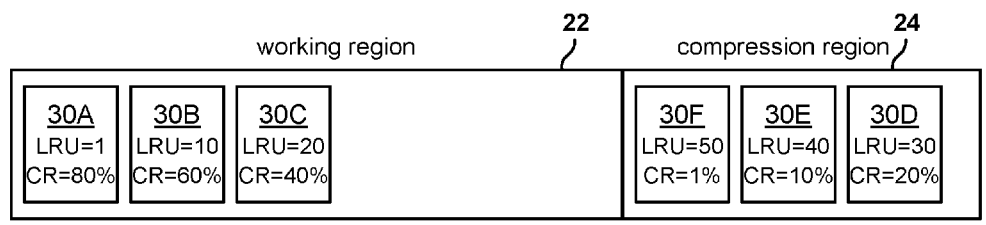
FIG. 4 illustrate an operation result of a conventional solution by taking actual memory contents as an example.

As previously described, regardless of the usage ratios of the working region 22 and the compression region 24, a conventional memory management module determines which page is to be transferred to the compression region 24 according to solely the recent usage index. As such, when the situation in FIG. 3(D) arises, the conventional memory management module selects the page 30D having the highest recent usage index, and compresses and transfers the page 30D to the compression region 24, with a situation after the transfer as shown in FIG. 4. In the situation in FIG. 4, the compression ratios CR of the pages 30D to 30F in the compression region 24 are all very low, i.e., for the same set of data, data volume before compression does not differ much from data volume after the compression, such that the compression region 24 can barely accommodate more compressed data pages. In comparison, by also considering the compression ratio CR, the management module 12 is capable of storing a greater number of pages into the compression region 24. Relatively speaking, as the number of pages that can be stored into the compression region 24 has increased, the usage ratio of the working region 22 is effectively reduced. More specifically, in average, the memory management apparatus 100 effectively increases the number of sets of data that can be stored into the compression region 24. Given the same data volume that needs to be stored, the size of the compression region is reduced to equivalently increase the available capacity of the working region 24, thereby frequency of data exchange between the two regions becomes lower.

In one embodiment, when the usage ratio of the working region 22 is lower than the first threshold, the management module 12 determines whether to move a set of target data from the working region 22 to the compression region 24 according to whether an exchange condition. In addition the recent usage index and the compression ratio, the exchange condition is also associated with a set of first data stored in the compression region. More specifically, when the exchange condition is met, the compression/decompression module 14 not only compresses and move the target data to the compressed region, but also decompresses the first data and moves the decompressed first data to the working region 24. This is equivalent to exchanging storage regions of the target data and the first data. Conversely, when the exchange condition is not met, the target data is not transferred to the compression region 24.

In one embodiment, the managing unit 12C selects a set of data having the lowest compression ratio CR from the compression region 24 as the first data, and determines whether the exchange condition is met considering the compression ratio CR of the first data, the compression ratio CR of the target data, and the recent usage index of the target data. Taking the situation in FIG. 3(F) for example, the managing unit 12 selects the page 30F having the lowest compression ratio CR from the four sets of data stored in the compression region 24 as the first data. Assume that the managing unit 12C sets number '25' as a recent usage index threshold for selecting target data. That is to say, a page having a recent usage index higher than 25 in the working region 22 qualifies as a candidate for target data. The exchange condition is met when "a page having a recent usage index higher than 25 and a compression ratio CR higher than the compression ratio CR of the page 30F exists in the working region 22". According to this exchange condition, the managing unit 12C determines that the page 30D is the target data. Thus, the managing unit 12 controls the compression/decompression module 14 to decompress the page 30F and compress the page 30D, and further controls the compression/decompression module 14 to transfer the decompressed page 30F to the working region 22 and move the compressed page 30D to the compression region 24. As the compression ratio CR of the page 30D is higher than the compression ratio CR of the page 30F, more space in the compression region 24 is available for use by exchanging the storage positions of these two pages.

In another embodiment, the managing unit 12 determines whether the exchange condition is established according to a weighted sum of the recent usage index LRU and the compression ratio CR. For example, the managing unit 12C selects a set of data having a lowest weighted sum from the compression region 24 as first data, and selects a set of data having a highest weighted sum from the working region 22 as target data. When the weighted sum of the first data is lower than the weighted sum of the target data, the managing unit 12 determines that the exchange condition is established. Implementation details of the recent usage index LRU and the compression ratio CR are similar to those described in foregoing examples, and shall be omitted herein.

In another embodiment, the managing unit 12C selects a set of data having a lowest predetermined index from the compression region 24 as the first data, and selects a set of data having a highest predetermined index from the working region 22 as the target data. When the index of the target data is higher than the index of the first data, the managing unit 12C determines that the exchange condition is established, and thus the first data and the target data are exchanged. The predetermined index may be a weighted sum of the recent usage index and the compression ratio CR, or solely the compression ratio CR. In practice, the weighted sum of the predetermined index may be dynamically adjusted according to the current usage ratio of the compression region 24. In general, the significance of the compression ratio correspondingly increases as the usage ratio of the compression region 24 rises.

In another embodiment, in addition to considering whether the usage ratio of the working region 22 is lower than the first threshold, the managing unit 12C further considers whether the usage ratio of the compression region 24 is higher than a second threshold. That is, only when the usage ratio of the working region 22 is lower than the first threshold and the used ratio of the compression region 24 is higher than the second threshold, the managing unit 12C then determines whether to transfer and store a set of target data from the working region 22 to the compression region 24 according to whether an exchange condition. In other words, only when the available space in the compression region 24 falls short, the managing unit 12C then begins to selectively exchange data between the two memory regions.

Figure 5:
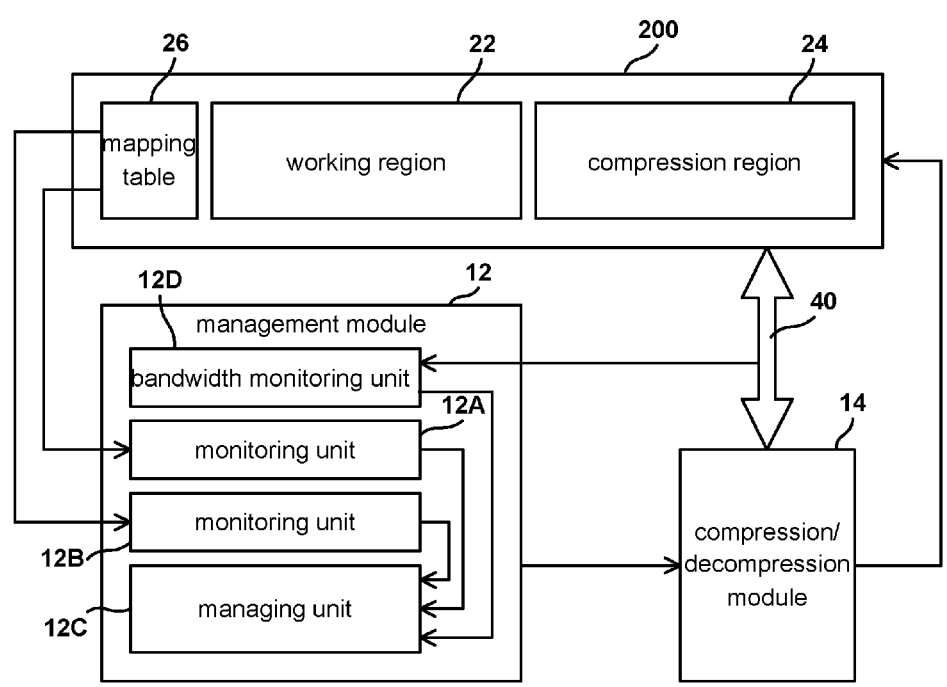
FIG. 5 is a schematic diagram of a management module further including a bandwidth monitoring unit according to an embodiment of the present invention.

FIG. 5 shows another detailed example of the management module 12 according to another embodiment. In this example, the management module 12 further includes a bandwidth monitoring unit 12D that evaluates an available bandwidth associated with the memory 200. For example, the bandwidth monitoring unit 12D evaluates an available bandwidth between the compression/decompression module 14 and the memory 200. The foregoing exchange condition may include whether the available bandwidth is greater than a bandwidth threshold. In this example, only when the available bandwidth is greater than the bandwidth threshold, the managing unit 12C then determines whether to exchange data according to the weighted sum of the recent used index LRU and the compression ratio CR. It should be noted that, the bandwidth monitoring unit 12D is an optional element. However, through setting the bandwidth threshold, possible interferences upon other memory management procedures as a result of inappropriate resource consumption by the data exchange can be alleviated. The managing unit 12C that considers the usage ratio of the compression region 24 and the bandwidth monitoring unit 12D may be independent units, and the corresponding steps in a sequence may also be exchanged.

In one embodiment, the compression/decompression module 14 is designed as a compression solution to be applied to data to be compressed according to an available amount of a compression resource (e.g., operation resources of the compression/decompression module 14 or the bandwidth of a bus 40). Given ample resources, the compression/decompression module 14 may adopt a solution that is more time-consuming and yet yields a preferred compression effect to further increase the available space of the compression region 24.

In practice, functions of the management module 12 and the compression/decompression module 14 may be realized by a primary processor that an electronic system utilizes for operating with the memory 200. In one embodiment, at least one of the management module 12 and the compression/decompression module 14 is disposed in an auxiliary processor. The auxiliary processor is different from a primary processor that an electronic system utilizes for operating with the memory 200. In other words, apart from a core processor, provided that the electronic system includes other hardware with operation capabilities, the functions of the management module 12 and the compression/decompression module 14 may be partly or entirely handled by the auxiliary processor to mitigate a load of the core processor.

Figure 6:
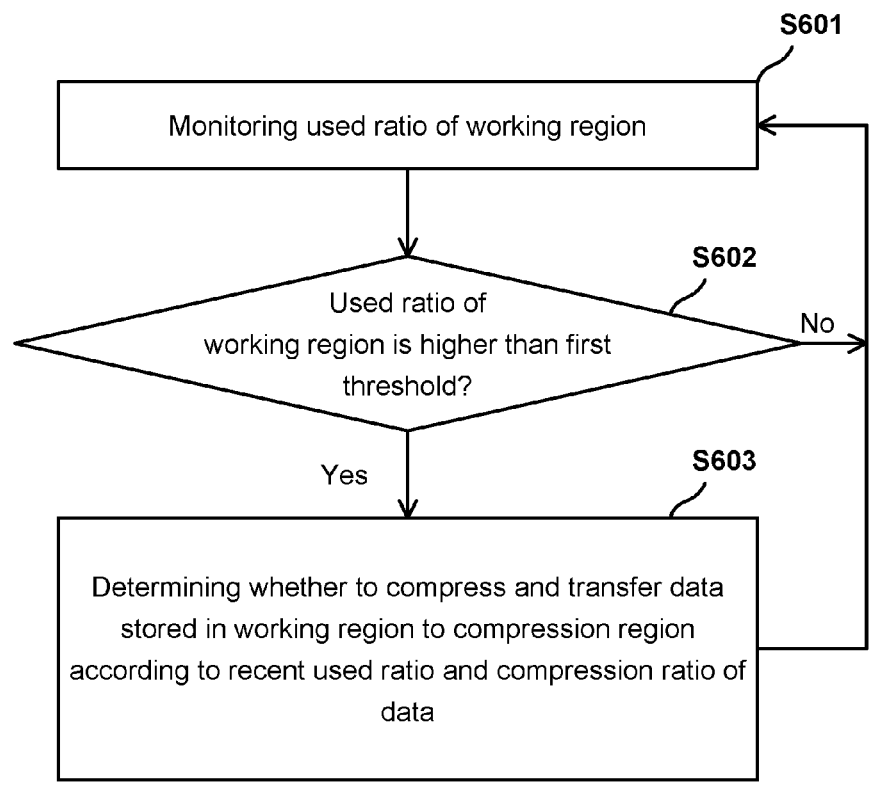
FIG. 6 is a flowchart of a method for managing a memory according to an embodiment of the present invention.

FIG. 6 shows a flowchart of a memory management method for managing a memory including a working region and a compression region according to another embodiment of the present invention. The working region stores uncompressed data, and the compression region stores compressed data. In step S601, a usage ratio of the working region is monitored. In step S602, it is determined whether the usage ratio of the working region is higher than a first threshold. Step S601 is iterated when a determination result of step S602 is negative. When the determination result of step S602 is affirmative, step S603 is performed. In step S603, according to a recent usage ratio and a compression ratio of a set of data stored in the working region, it is determined whether to compress and transfer the data to the compression region. The process returns to step S601 after step S603.

Figure 7:
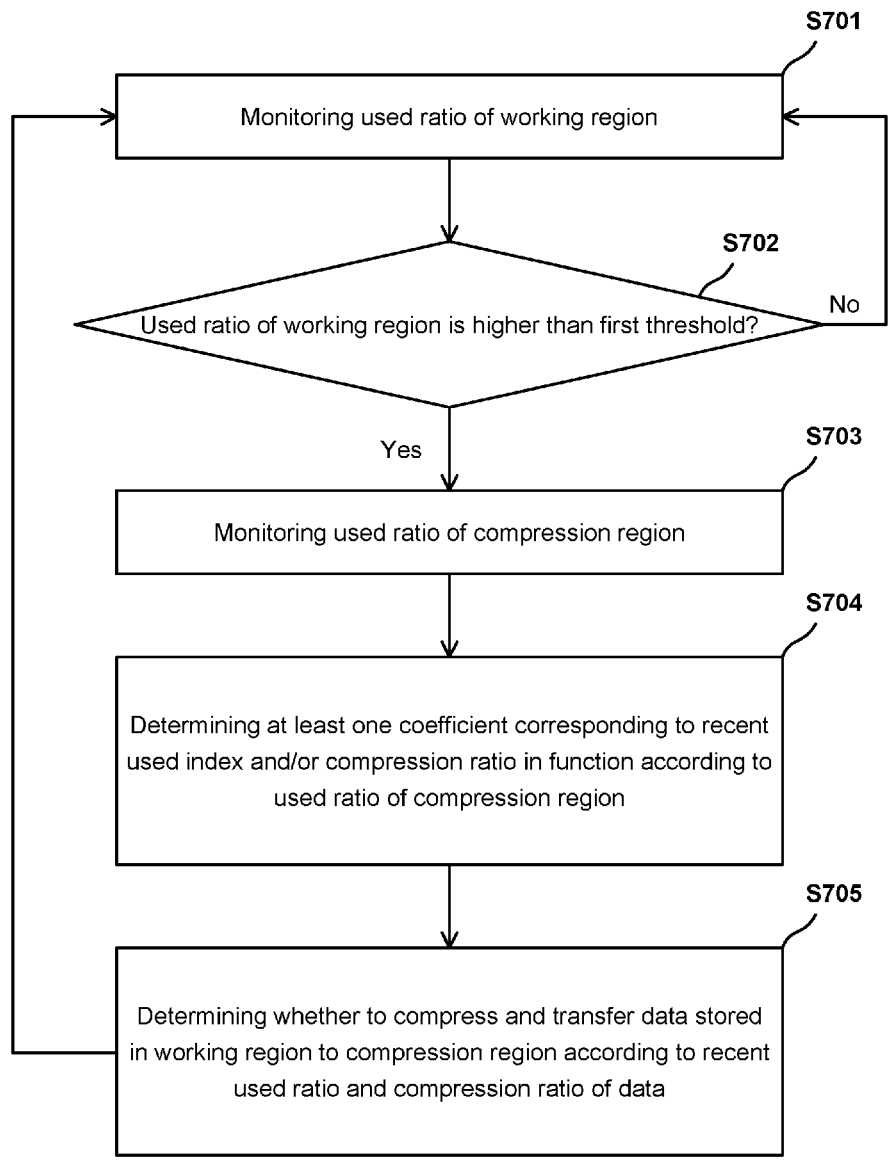
FIG. 7 is a flowchart of a method for managing a memory according to another embodiment of the present invention.

FIG. 7 shows a flowchart of a memory management method for managing a memory including a working region and a compression region according to another embodiment of the present invention. The memory management method in FIG. 7 incorporates other memory management steps into the technical concept in FIG. 6 for a further application. In step S701, a usage ratio of the working region is monitored. In step S702, it is determined whether a usage ratio of the working region is higher than a first threshold. Step S701 is iterated when a determination result of step S702 is negative. When the determination result of step S702 is affirmative, step S703 is performed to monitor a usage ratio of the compression region. In step S704, at least one coefficient (e.g., the coefficients W1 and W2 in equation (1)) corresponding to a recent usage index and/or a compression ratio in a function is determined according to the usage ratio of the compression region. In step S705, according to the recent usage ratio and the compression ratio of a set of data stored in the working region, it is determined whether to compress and transfer the data to the compression region. As previously stated, as the usage ratio of the compression region gets higher, the at least one coefficient is set in a way that the function value referred in step S705 becomes more associated with the compression ratio. The process returns to step S701 after step S705.

Figure 8:
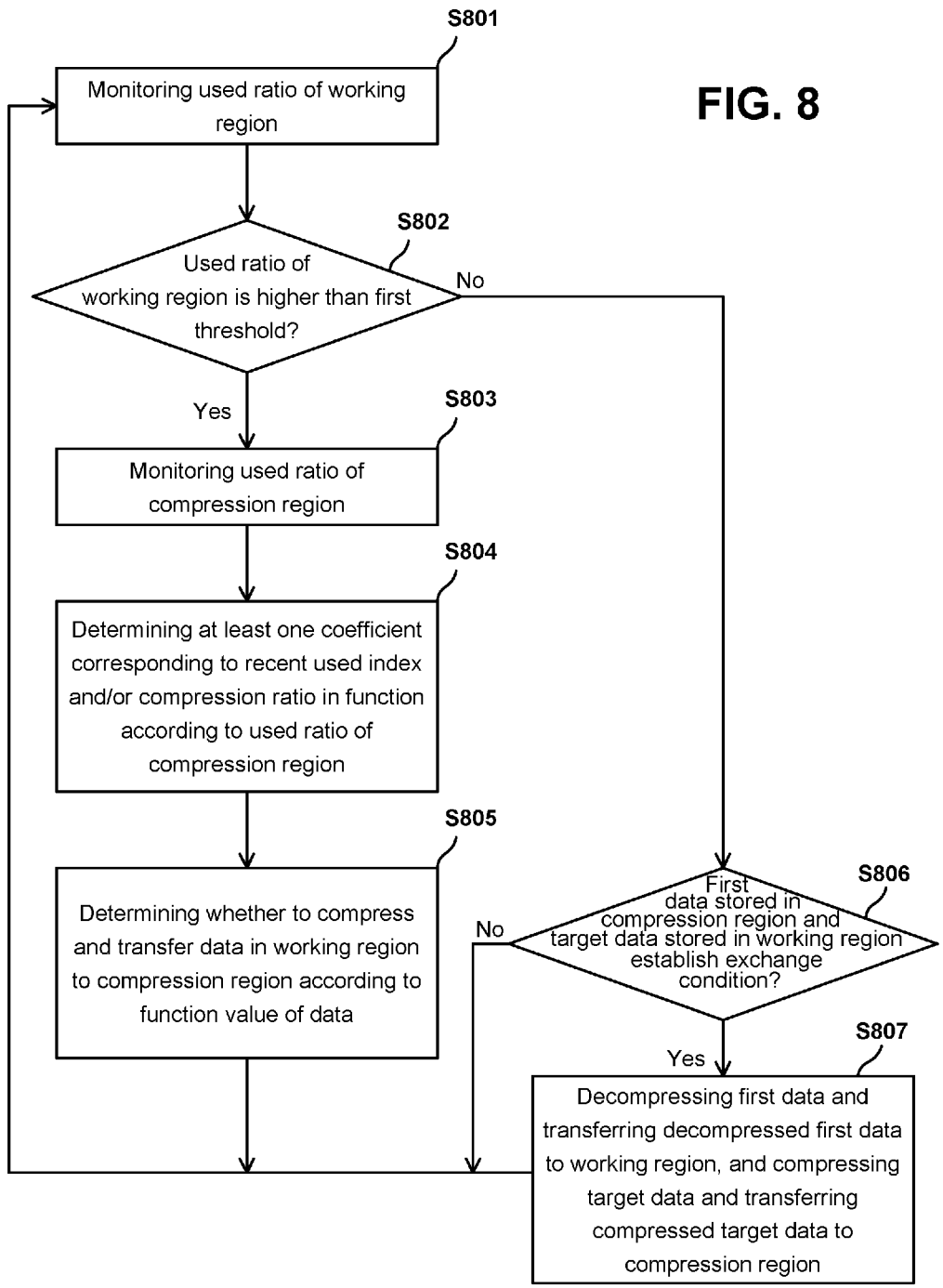
FIG. 8 is a flowchart of a method for managing a memory according to another embodiment of the present invention.

FIG. 8 shows a flowchart of a memory management method for managing a memory including a working region and a compression region according to another embodiment of the present invention. The memory management method in FIG. 8 incorporates other memory management steps into the technical concept in FIG. 7 for a further application. In this embodiment, when a usage ratio of the working region is lower than a first threshold (i.e., a determination result of step S802 is negative), step S806 is performed to determine whether first data stored in the compression region and target data stored in the working region establish an exchange condition. Details of the exchange condition may be referred from the associated description in the foregoing embodiments. Step S807 is performed when a determination result of step S806 is affirmative. In step S807, the first data is decompressed and transferred to the working region, and the target data is compressed and transferred to the compression region. Step S801 is iterated when the determination result of step S806 is negative. Step S801 is also iterated after step S805 or step S807.

Figure 9:
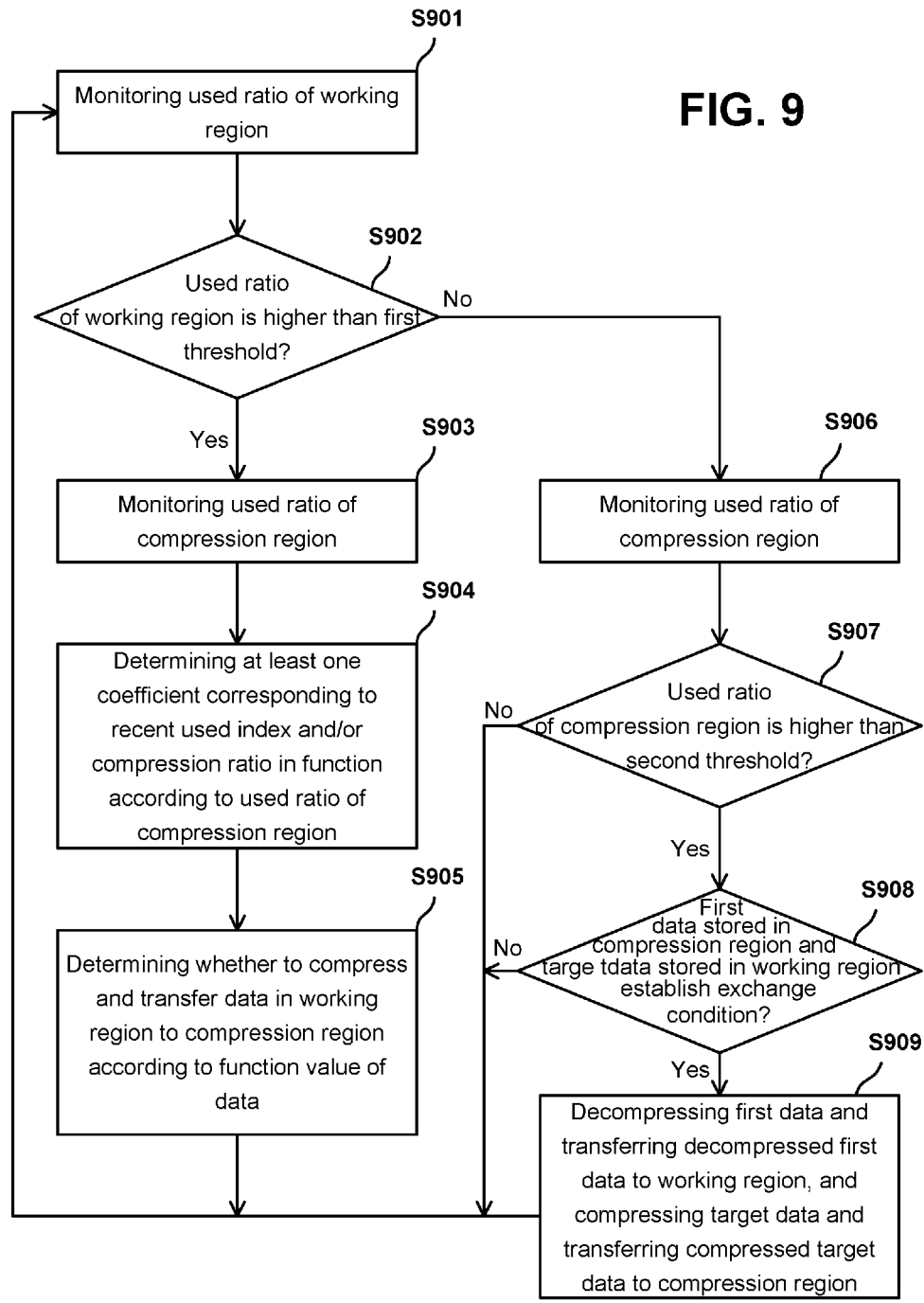
FIG. 9 is a flowchart of a method for managing a memory according to another embodiment of the present invention.

FIG. 9 shows a flowchart of a memory management method for managing a memory including a working region and a compression region according to another embodiment of the present invention. The memory management method in FIG. 9 incorporates other memory management steps into the technical concept in FIG. 8 for a further application. In this embodiment, when a usage ratio of the working region is lower than a first threshold (i.e., a determination result of step S902 is negative), step S906 is performed to monitor a usage ratio of the compression region. In step S907, it is determined whether the usage ratio of the compression region is higher than a second threshold. When a determination result of step S907 is affirmative, step S908 is performed to determine whether an exchange condition is established. Step S908 and step S909 are identical to step S806 and step S807 in FIG. 8.

Figure 10:
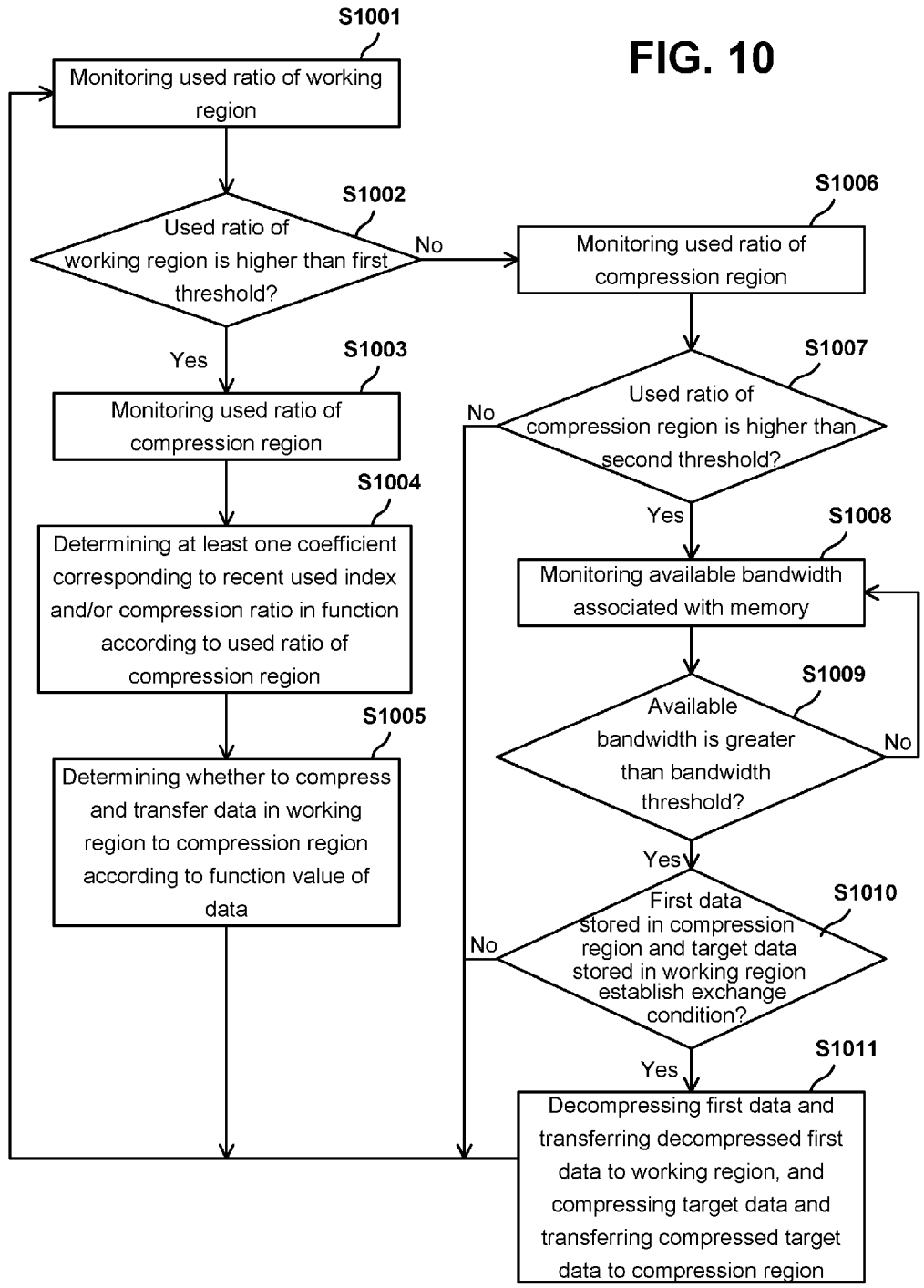
FIG. 10 is a flowchart of a method for managing a memory according to another embodiment of the present invention.

FIG. 10 shows a flowchart of a memory management method for managing a memory including a working region and a compression region according to another embodiment of the present invention. The memory management method in FIG. 10 incorporates other memory management steps into the technical concept in FIG. 9 for a further application. In this embodiment, when a usage ratio of the compression region is higher than a second threshold (i.e., a determination result of step S1007 is affirmative), step S1008 is performed to monitor an available bandwidth associated with the memory. In step S1009, it is determined whether the available bandwidth is greater than a bandwidth threshold. Step S1008 is iterated when a determination result of step S1009 is negative. In another embodiment, step S1001 is iterated when the determination result of step S1009 is negative. When a determination result of step S1009 is affirmative, step S1010 is performed to determine whether an exchange condition is established. Step S1010 and step S1011 are identical to step S806 and step S807 in FIG. 8.

One person skilled in the art can easily understand that, sequences of some steps or combinations of determination logics in the above processes can be equivalently exchanged without affecting overall effects of the memory management method. Further, various operation modifications (e.g., determining the compression solution according to compression resources) in the description associated with the memory management apparatus 100 are also applicable to the memory management method in FIG. 6 to FIG. 10, and shall be omitted herein.

A memory management method for managing a memory including a working region and a compression region is provided according to another embodiment of the present invention. It is first determined whether a usage ratio of the working region and a usage ratio of the compression region establish a predetermined condition. When the predetermined condition is established, according to a recent usage index and a compression ratio of a set of target data stored in the working region, it is determined whether to transfer the target data to the compression region. Taking the process in FIG. 6 for example, step S603 is performed only when the usage ratio of the working region is higher than the first threshold. Taking the process in FIG. 7 for example, only when the usage ratio of the working region is higher than the first threshold and the usage ratio of the compression region renders a coefficient associated with the compression ratio to be a non-zero value, it is determined whether to transfer the target data to the compression region according to both the recent usage index and the compression ratio of the target data.

In conclusion, a memory management method and a memory management apparatus are provided by the present invention. By simultaneously considering the recent usage index and the compression ratio of data, the management method and the management apparatus of the present invention effectively increase the amount of data that can be stored in the compression region. In other words, given the same data volume to be stored, the size of the compression region can be reduced, which is equivalently increasing the available capacity of the working region and reducing the frequency of data exchange. Further, by handling a part of all of the memory management task to an auxiliary processor, a primary processor that an electronic system utilizes for operating with the memory can be prevent from an excessive additional load.

While the invention has been described by way of example and in terms of the preferred embodiments, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. An apparatus for managing a memory, the memory comprising a working region and a compression region, the working region storing uncompressed data, the apparatus comprising:
    a management module, configured to determine whether a set of target data is to be moved from the working region to the compression region according to a recent usage index and a compression ratio of the set of target data; and
    a compression/decompression module, configured to compress the set of target data and to move the compressed target data to the compression region when the management module determines that the set of target data is to be moved,
    wherein when a usage ratio of the working region is lower than a first threshold, the management module determines whether to move the target data to the compression region according to an exchange condition; the exchange condition is associated with the recent usage index and the compression ratio of the target data, and is associated with a set of first data in the compression region; when the exchange condition is established, the compression/decompression module compresses the target data, moves the compressed target data to the compression region, decompresses the first data, and moves the decompressed first data to the working region.

2. The apparatus according to claim 1, wherein a function using the recently used index and the compression ratio as independent variables is pre-defined the management module calculates a function value of the function and determines whether to move the target data according to the function value.

3. The apparatus according to claim 2, wherein the management module comprises:
 a monitoring unit for the working region, configured to monitor a usage ratio of the working region;
 a monitoring unit for the compression region, configured to monitor a usage ratio of the compression region; and
 a managing unit, configured to determine at least one coefficient corresponding to at least one of the recent usage index and the compression ratio in the function, according to at least one of the usage ratio of the working region and the usage ratio of the compression region.

4. The apparatus according to claim 3, wherein the managing unit sets the at least one coefficient in a way that the function value is more associated with the compression ratio as the usage ratio of the compression region gets higher.

5. The apparatus according to claim 1, wherein when the usage ratio of the working region is higher than a first threshold, the management module determines whether to move the target data to the compression region according to the recent usage index and the compression ratio of the target data.

6. The apparatus according to claim 1, wherein the first data is a set of data having a lowest compression ratio in the compression region, and the exchange condition is associated with the compression ratio of the first data.

7. The apparatus according to claim 1, wherein when a usage ratio of the working region is lower than a first threshold and a usage ratio of the compression region is higher than a second threshold, the management module determines whether to move the target data to the compression region according to an exchange condition; the exchange condition is associated with the recent usage index and the compression ratio of the target data, and is associated with a set of first data in the compression region; when the exchange condition is met, the compression/decompression module compresses the target data, moves the compressed target data to the compression region, decompresses the first data, and moves the decompressed first data to the working region.

8. The apparatus according to claim 7, wherein the management module comprises:
 a bandwidth monitoring unit, configured to monitor an available bandwidth associated with the memory, wherein the exchange condition comprises whether the available bandwidth is greater than a bandwidth threshold.

9. The apparatus according to claim 1, wherein the compression/decompression module determines a compression solution applied to the target data according to an available amount of a compression resource.

10. The apparatus according to claim 1, wherein at least one of the management module and the compression/decompression module is disposed in an auxiliary processor, which is different from a primary processor utilized by an electronic system that the memory operates with.

11. A method for managing a memory, the memory comprising a working region and a compression region, the working region storing uncompressed data, the method comprising:
 a) determining whether a set of target data stored in the working region is to be moved to the compression region according to a recent usage index and a compression ratio of the target data; and
 b) when a determination result of step (a) is affirmative, compressing the target data, and moving the compressed target data to the compression region,
 determining whether a usage ratio of the working region is lower than a first threshold; and
 when the usage ratio of the working region is lower than the first threshold, determining whether to move the target data to the compression region according to an exchange condition; the exchange condition is associated with the recent usage index and the compression ratio of the target data, and is further associated with first data in the compression region; when the determination result of step (a) is affirmative, step (b) further comprises, in addition to compressing and moving the target data to the compression region, decompressing and moving the first data to the working region.

12. The method according to claim 11, wherein step (a) comprises calculating a function value of a function according to the recent usage index and the compression ratio, and determining whether to move the target data to the compression region according to the function value, with the function using the recent usage index and the compression ratio as independent variables being pre-defined.

13. The method according to claim 12, wherein step (a) further comprises adjusting at least one coefficient corresponding to at least one of the recent usage index and the compression ratio in the function, according to at least one of the usage ratio of the working region and the usage ratio of the compression region.

14. The method according to claim 11, further comprising:
 c1) determining whether the usage ratio of the working region is higher than a first threshold; and
 c2) when a determination result of step (c1) is affirmative, performing step (a) on the target data stored in the working region.

15. The method according to claim 11, further comprising:
 determining whether a usage ratio of the compression region is higher than a second threshold; and
 when the usage ratio of the compression region is higher than a second threshold, performing step (a).

16. The method according to claim 15, wherein the first data is a set of data having a lowest compression ratio in the compression region, and the exchange condition is associated with the compression ratio of the first data.

17. A method for managing a memory, the memory comprising a working region and a compression region, the working region storing uncompressed data, the method comprising:
 a) determining whether a predetermined condition is met according to a usage ratio of the working region and a usage ratio of the compression region;

b) when a determination result of step (a) is affirmative, determining whether to move a set of target data from the working region to the compression region according to a recent usage index and a compression ratio of the target data;

when the usage ratio of the working region is lower than a first threshold, determining whether an exchange condition is met according to the target data stored in the working region and first data stored in the compression region; and when the exchange condition is met, compressing the target data, moving resulting compressed target data to the compression region, decompressing the first data, and moving resulting decompressed first data to the working region.

18. The method according to claim 17, wherein determining the predetermined condition is met when the usage ratio of the working region is higher than a first threshold.

19. The method according to claim 17, wherein the exchange condition is associated with the recent usage index and the compression ratio of the target data, and is associated with first data in the compression region; a function using the recent usage index and the compression ratio as independent variables is pre-defined; the step of determining whether the exchange condition is met comprises:

c1) determining whether the compression ratio of the first data is lower than a compression ratio threshold; and c2) determining whether a function value, obtained from substituting the recent used index and the compression ratio of the first data into the function, is higher than a value threshold;

wherein, when determination results of step (c1) and step (c2) are both affirmative, the exchange condition is met.

20. The method according to claim 17, comprising:

when the usage ratio of the working region is lower than a first threshold and a usage ratio of the compression region is higher than a second threshold, determining whether an exchange condition is met according to the target data stored in the working region and a set of first data stored in the compression region.

* * * * *